United States Patent
Jacobs et al.

(10) Patent No.: US 9,317,229 B2
(45) Date of Patent: Apr. 19, 2016

(54) FINISHING COMPATIBILITY EVALUATION

(75) Inventors: Craig Jacobs, Patterson, NY (US);
David Uyttendaele, New York, NY (US); John Delbridge, New York, NY (US); Scott Manner, Montrose, NY (US)

(73) Assignee: Mimeo.com, Inc., New York, NY (US)

( * ) Notice: Subject to any disclaimer, the term of this patent is extended or adjusted under 35 U.S.C. 154(b) by 1143 days.

(21) Appl. No.: 11/551,954

(22) Filed: Oct. 23, 2006

(65) Prior Publication Data
US 2008/0144065 A1    Jun. 19, 2008

(51) Int. Cl.
*G06F 3/12* (2006.01)
*G06F 15/00* (2006.01)

(52) U.S. Cl.
CPC .............. *G06F 3/122* (2013.01); *G06F 3/1204* (2013.01); *G06F 3/1208* (2013.01); *G06F 3/1242* (2013.01)

(58) Field of Classification Search
USPC ......................................... 358/1.13; 355/321
See application file for complete search history.

(56) References Cited

U.S. PATENT DOCUMENTS

| | | | |
|---|---|---|---|
| 5,448,376 A * | 9/1995 | Ohta .............................. | 358/448 |
| 5,461,469 A * | 10/1995 | Farrell et al. .................... | 399/407 |
| 6,203,220 B1 | 3/2001 | Takenoshita et al. | |
| 6,229,984 B1 * | 5/2001 | Ohtani .......................... | 399/407 |
| 6,247,028 B1 | 6/2001 | Torisaki | |
| 6,417,931 B2 | 7/2002 | Mori et al. | |
| 6,879,943 B1 | 4/2005 | Shigemori | |
| 6,929,595 B2 | 8/2005 | Shimizu | |
| 6,977,741 B2 | 12/2005 | Eldridge et al. | |
| 7,047,490 B1 * | 5/2006 | Markovic et al. .............. | 715/234 |
| 7,282,687 B2 * | 10/2007 | Matsuda et al. ........... | 250/208.1 |
| 7,814,430 B2 * | 10/2010 | McComber ........... | G06F 3/0483 358/1.1 |
| 2001/0044868 A1 * | 11/2001 | Roztocil et al. ................ | 710/129 |
| 2002/0003903 A1 | 1/2002 | Engeldrum et al. | |
| 2002/0060675 A1 * | 5/2002 | Hashimoto ............. | G06T 11/60 345/204 |
| 2004/0114954 A1 * | 6/2004 | Ohtani ..................... | B41J 13/00 399/82 |
| 2006/0026512 A1 | 2/2006 | Hays et al. | |
| 2006/0028659 A1 | 2/2006 | Nishikawa | |

OTHER PUBLICATIONS

PCT/US2007/082171; PCT International Search Report and Written Opinion; May 7, 2009; 7 pages.

\* cited by examiner

*Primary Examiner* — Allen H Nguyen
(74) *Attorney, Agent, or Firm* — LaBatt, LLC

(57) ABSTRACT

A solution for evaluating a compatibility of a selected finishing with printed data of a document is provided. A page model is obtained for a page of the document, and its compatibility with a model of the selected finishing is evaluated. Each model can comprise a representation of a page/finishing (e.g., a bitmap) and/or a set of properties of the page/finishing. In an embodiment of the invention, the page model comprises a page bitmap and the finishing model comprises a finishing bitmap, which includes a set of impinged pixels. The two bitmaps are compared to determine whether any of the printed data in the page bitmap intersects any of the impinged pixels.

34 Claims, 5 Drawing Sheets

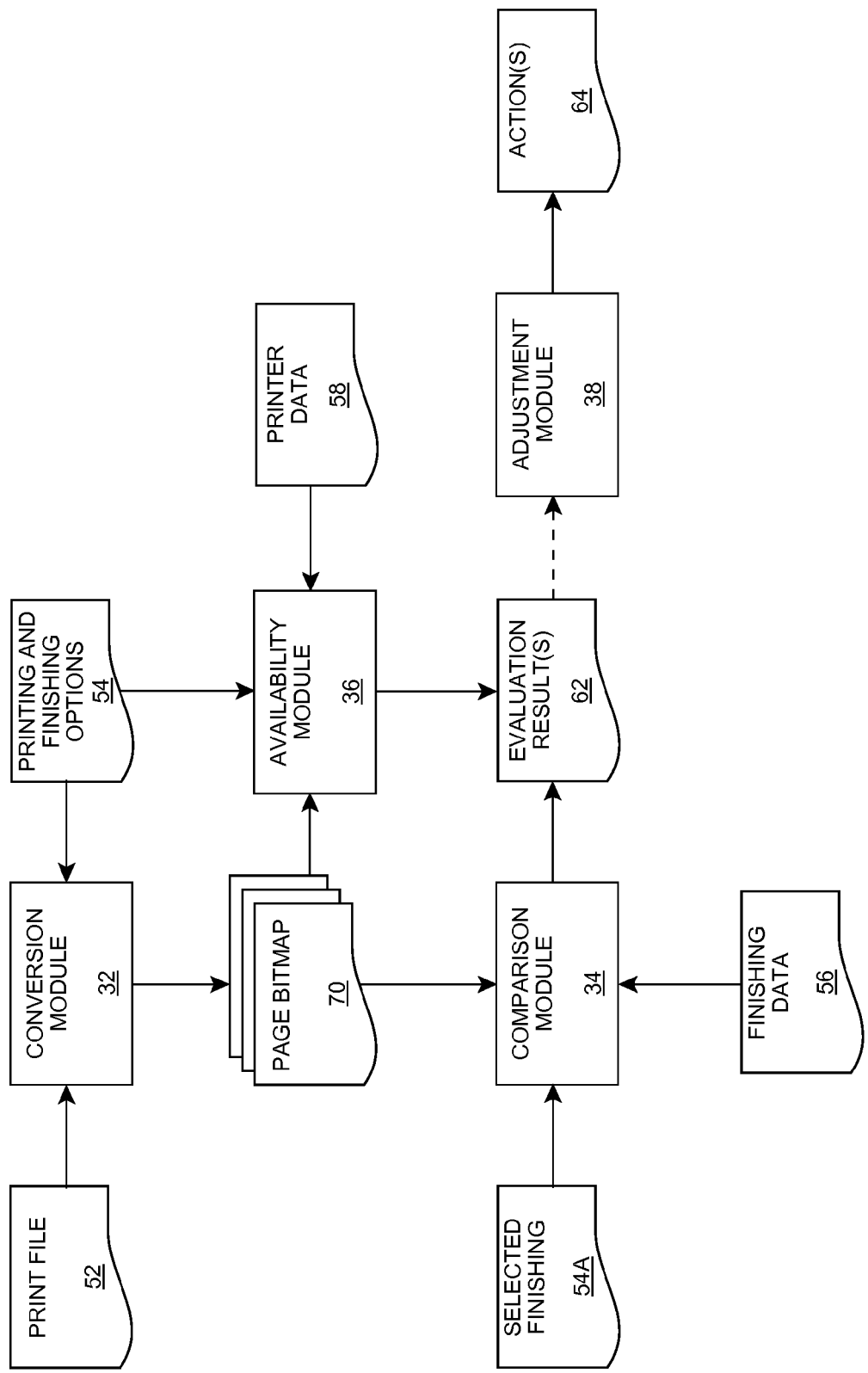

FINISHING COMPATIBILITY EVALUATION

FIELD OF THE INVENTION

Aspects of the invention relate generally to document printing and finishing, and more particularly, to a solution for evaluating whether a selected finishing is compatible with a document and/or one or more printing options.

BACKGROUND OF THE INVENTION

Frequently, a user will generate an electronic document and request that a copy of the document be printed on a medium (e.g., paper) and finished. A common finishing includes binding the pages of the document, using a binding solution such as spiral, saddle stitch, ring(s), glue, staple(s), and/or the like. With each finishing option, a portion of the medium may be impinged. However, a user may not realize that a selected finishing may impinge on some of the printed data prior to receiving the finished document. In this case, the user may need to reprint and/or re-finish the document causing frustration and wasting resources. This problem is further exacerbated when the user utilizes a third party (e.g., a print center) for the printing and/or finishing processes, in which case the satisfaction of the user's experience is lowered.

In view of the foregoing, a need exists to overcome one or more of the deficiencies in the related art.

BRIEF SUMMARY OF THE INVENTION

Aspects of the invention provide a solution for evaluating a compatibility of a selected finishing with printed data of a document. A page model is obtained for a page of the document, and its compatibility with a model of the selected finishing is evaluated. Each model can comprise a representation of a page/finishing (e.g., a bitmap) and/or a set of properties of the page/finishing. In an embodiment of the invention, the page model comprises a page bitmap and the finishing model comprises a finishing bitmap, which includes a set of impinged pixels. The two bitmaps are compared to determine whether any of the printed data in the page bitmap intersects any of the impinged pixels. One or more alternative finishings that do not impinge the printed data, if available, can be obtained and/or provided for selection by a user. Consequently, a finishing that will impinge printed data can be detected and, if desired, corrected before one or more copies of the document are printed and finished. In this manner, wasted printing and finishing resources can be reduced and user satisfaction can be increased.

A first aspect of the invention provides a method of managing a document, the method comprising: obtaining a page model for a page of the document and a finishing model for a selected finishing for the document; and evaluating a compatibility of the page with the selected finishing based on the page model and the finishing model.

A second aspect of the invention provides a system for managing a document, the system comprising: means for obtaining a page model for a page of the document and a finishing model for a selected finishing for the document; and means for evaluating a compatibility of the page with the selected finishing based on the page model and the finishing model.

A third aspect of the invention provides a computer program comprising program code stored on a computer-readable medium, which when executed, enables a computer system to implement a method of managing a document, the method comprising: obtaining a page model for a page of the document and a finishing model for a selected finishing for the document; and evaluating a compatibility of the page with the selected finishing based on the page model and the finishing model.

A fourth aspect of the invention provides a method of generating a system for managing a document, the method comprising: providing a computer system operable to: obtain a page model for a page of the document and a finishing model for a selected finishing for the document; and evaluate a compatibility of the page with the selected finishing based on the page model and the finishing model.

A fifth aspect of the invention provides a method of managing the generation of a finished document, the method comprising: obtaining a finishing model based on a selected finishing for a document; obtaining a page bitmap for a page of the document; and determining whether any printed data in the page bitmap will be impinged by the selected finishing based on the finishing model and the corresponding page bitmap.

A sixth aspect of the invention provides a system for managing the generation of a finished document, the system comprising: means for obtaining a finishing model based on a selected finishing for a document; means for obtaining a page bitmap for a page of the document; and means for determining whether any printed data in the page bitmap will be impinged by the selected finishing based on the finishing model and the corresponding page bitmap.

A seventh aspect of the invention provides a computer program comprising program code stored on a computer-readable medium, which when executed, enables a computer system to implement a method of managing a document, the method comprising: obtaining a finishing model based on a selected finishing for a document; obtaining a page bitmap for a page of the document; and determining whether any printed data in the page bitmap will be impinged by the selected finishing based on the finishing model and the corresponding page bitmap.

An eighth aspect of the invention provides a method of generating a system for managing the generation of a finished document, the method comprising: providing a computer system operable to: obtain a finishing model based on a selected finishing for a document; obtain a page bitmap for a page of the document; and determine whether any printed data in the page bitmap will be impinged by the selected finishing based on the finishing model and the corresponding page bitmap.

A ninth aspect of the invention provides a business method for managing a document, the business method comprising managing a computer system that performs the process described herein; and receiving payment based on the managing and/or performing the process.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 3 shows an illustrative data flow diagram for the modules of the compatibility program of FIG. 2 according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for evaluating a compatibility of a selected finishing with printed data of a document. A page model is obtained for a page of the document, and its compatibility with a model of the selected finishing is evaluated. Each model can comprise a representation of a page/finishing (e.g., a bitmap) and/or a set of properties of the page/finishing. In an embodiment of the invention, the page model comprises a page bitmap and the finishing model comprises a finishing bitmap, which includes a set of impinged pixels. The two bitmaps are compared to determine whether any of the printed data in the page bitmap intersects any of the impinged pixels. One or more alternative finishings that do not impinge the printed data, if available, can be obtained and/or provided for selection by a user. Consequently, a finishing that will impinge printed data can be detected and, if desired, corrected before one or more copies of the document are printed and finished. In this manner, wasted printing and finishing resources can be reduced and user satisfaction can be increased. As used herein, unless otherwise noted, the term "set" means one or more (i.e., at least one) and the phrase "any solution" means any now known or later developed solution.

Figure 1:
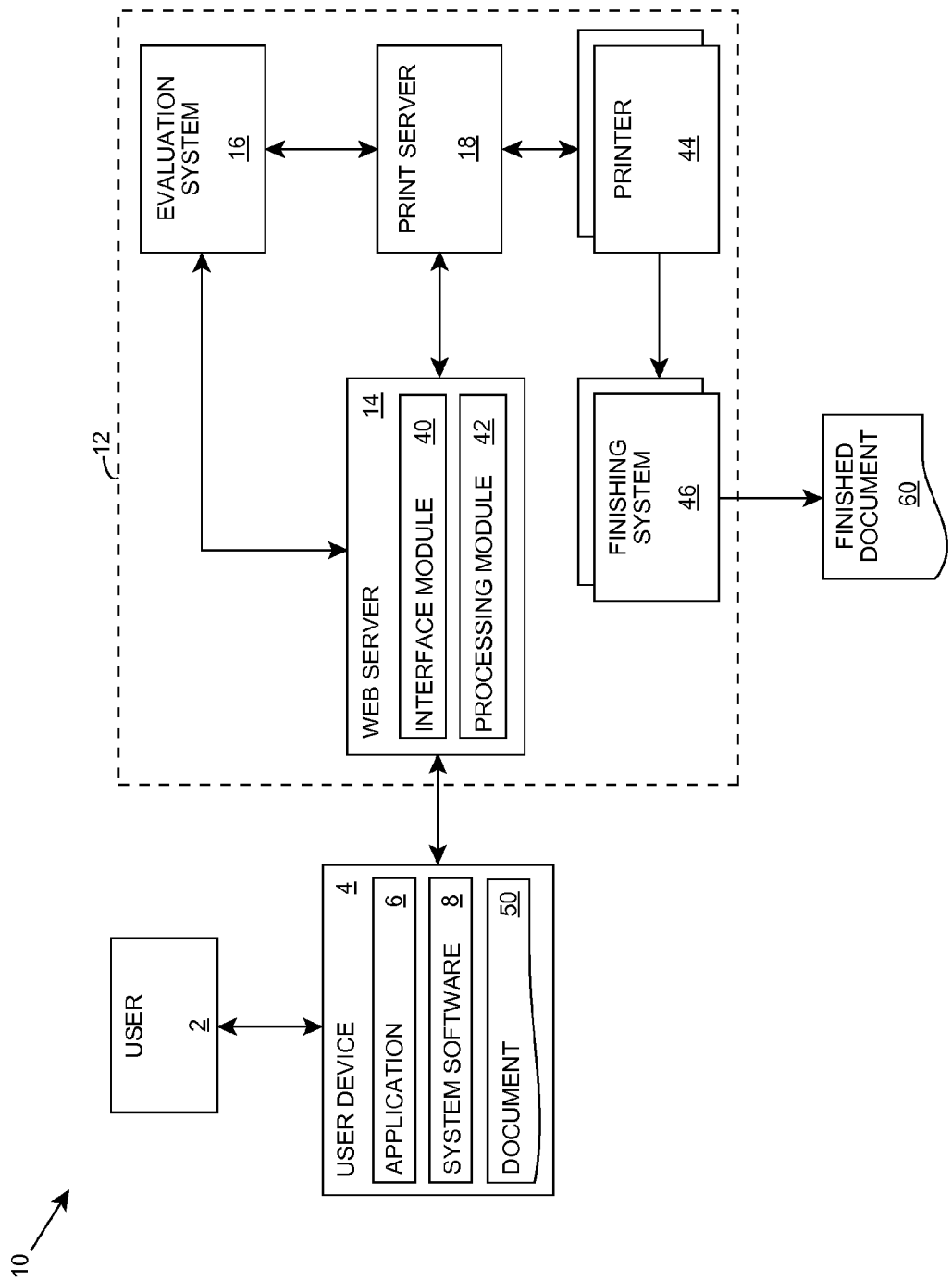
FIG. 1 shows an illustrative environment for managing a document according to an embodiment of the invention.

Turning to the drawings, FIG. 1 shows an illustrative environment 10 for managing a document according to an embodiment of the invention. In particular, environment 10 can manage the document from its creation as one or more electronic files to its printing and finishing as a finished document 60. To this extent, environment 10 is shown including a user device 4, which includes an application 6 and system software 8. In general, a user 2 utilizes application 4 to create an electronic document 50. Once electronic document 50 is ready for printing and finishing, system software 8 can provide document 50 or a representation thereof (e.g., a page description language (PDL) file, a set of bitmaps (raster images), or the like) for processing by computer system 12. Computer system 12 can generate a finished document 60 based on document 50 by performing the process described herein.

In environment 10, document 50 or a representation thereof (hereafter document 50) can be transmitted from user device 4 to computer system 12 using any public or private network. However, it is understood that this is only illustrative of various environments in which the invention can be implemented. For example, in an alternative environment, document 50 can be provided to a computer system 12 using a computer-readable medium on which a copy of document 50 is embodied. Further, another alternative environment could comprise a single computing device that performs the entire process described herein to manage the document. It is understood that numerous other alternative environments including one or more computing devices performing some or all of the process described herein are possible according to aspects of the invention. Additionally, it is understood that environment 10 can include additional components for performing additional functions. For example, computer system 12 can enable a user 2 to manage long term storage of a copy of document(s) 50, during which copies of the document(s) 50 may or may not be printed and/or finished.

In any event, as depicted, computer system 12 includes a web server 14, an evaluation system 16, and a print server 18. In general, system software 8 can communicate document 50 to interface module 40. In response, interface module 40 can provide a set of web pages or the like for display on user device 4, which enable user 2 to place a print order for document 50 by providing the required information and/or payment to computer system 12.

Interface module 40 can enable user 2 to select various printing options (e.g., paper size, orientation, paper color, black and white/color, resolution, pages per sheet (e.g., one sided, two sided, bi-fold, etc.), and/or the like). Additionally, interface module 40 can enable user 2 to select from one of a plurality of finishing options. A finishing comprises any process performed to one or more pages of a printed copy of the document 50. Illustrative finishings include adding cover(s), binding the pages (e.g., spiral, saddle stitch, ring(s), glue, staple(s), and/or the like), applying a seal or watermark, varnishing, and/or the like. Based on the selected printing options and/or finishing options, interface module 40 also can generate a preview of what finished document 60 will look like. Further, interface module 40 can obtain additional order information, such as a number of copies of finished document 60, shipping address(es), billing/payment information, and/or the like.

In any event, once user 2 places an order, processing module 42 can process the order. In particular, processing module 42 can provide document 50 to print server 18, which manages (e.g., schedules, selects printer(s) 44, and/or the like) printing one or more copies of document 50 on one or more printers 44. The printed copy(ies) of the document are provided to one or more finishing systems 46 and finished to generate finished document(s) 60. Finished document(s) 60 can be provided (e.g., shipped) to user 2 and/or one or more other parties. To this extent, processing module 42 also can enable user 2 to track progress with respect to the generation of finished document(s) 60, the shipment of finished document(s) 60, and/or the like.

At any time during the order placing/processing, evaluation system 16 can evaluate the order. In particular, evaluation system 16 can evaluate a compatibility of one or more of the options (printing and/or finishing) selected by user 2 with document 50, finishing system 46, and/or printer 44. For example, evaluation system 16 can determine whether a finishing is compatible with document 50 and/or a printer 44. Further, evaluation system 16 can determine whether a set of printing options are compatible with document 50 and/or printer 44. It is understood that evaluation system 16 can perform the evaluation in order to detect incompatible selections made by user 2, limit available selections for user 2, and/or a combination thereof. In the former case, evaluation system 16 can provide a warning of the incompatibility, can provide a set of possible actions to address the incompatibility, and/or the like. In the latter case, interface module 40 can generate a set of options for user 2 based on results obtained from evaluation system 16.

Figure 2:
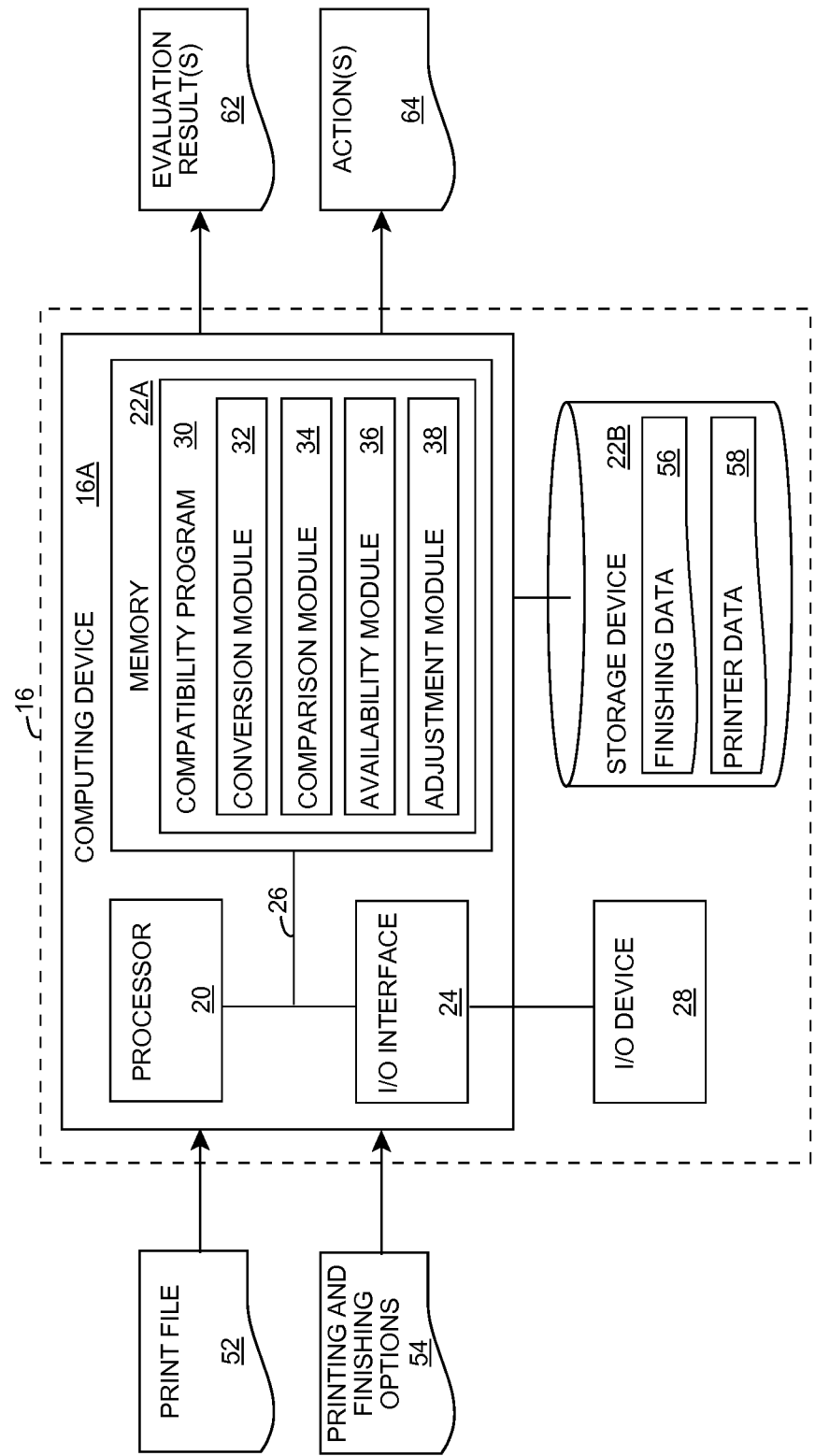
FIG. 2 shows a more detailed view of an illustrative evaluation system according to an embodiment of the invention.

FIG. 2 shows a more detailed view of an illustrative evaluation system 16 according to an embodiment of the invention. In particular, evaluation system 16 includes a computing device 16A that can perform the process described herein in order to evaluate a compatibility of printing option(s), finishing option(s), and/or document 50 (FIG. 1). In particular, evaluation system 16 is shown including a computing device 16A that comprises a compatibility program 30, which makes computing device 16A operable to evaluate the compatibility by performing the process described herein.

Computing device 16A is shown including a processor 20, a memory 22A, an input/output (I/O) interface 24, and a bus 26. Further, computing device 16A is shown in communication with an external I/O device/resource 28 and a storage device 22B. In general, processor 20 executes program code, such as compatibility program 30, which is stored in a storage system, such as memory 22A and/or storage device 22B. While executing program code, processor 20 can read and/or write data, such as finishing data 56, to/from memory 22A, storage device 22B, and/or I/O interface 24. Bus 26 provides a communications link between each of the components in computing device 16A. I/O device 28 can comprise any device that transfers information between a user and computing device 16A. To this extent, I/O device 28 can comprise a user I/O device to enable an individual user to interact with computing device 16A and/or a communications device to enable a system user, such as web server 14 (FIG. 1), to communicate with computing device 16A using any type of communications link.

In any event, computing device 16A can comprise any general purpose computing article of manufacture capable of executing program code installed thereon. However, it is understood that computing device 16A and compatibility program 30 are only representative of various possible equivalent computing devices that may perform the process described herein. To this extent, in other embodiments, the functionality provided by computing device 16A and compatibility program 30 can be implemented by a computing article of manufacture that includes any combination of general and/or specific purpose hardware and/or program code. In each embodiment, the program code and hardware can be created using standard programming and engineering techniques, respectively.

Similarly, evaluation system 16 is only illustrative of various types of computer systems for implementing aspects of the invention. For example, in one embodiment, evaluation system 16 comprises two or more computing devices that communicate over any type of communications link to perform the process described herein. Further, while performing the process described herein, one or more computing devices in evaluation system 16 can communicate with one or more other computing devices external to evaluation system 16 using any type of communications link. In either case, the communications link can comprise any combination of various types of wired and/or wireless links; comprise any combination of one or more types of networks; and/or utilize any combination of various types of transmission techniques and protocols. Still further, evaluation system 16 could be implemented as part of another computer system, such as web server 14 (FIG. 1) and/or print server 18 (FIG. 1), rather than separately as shown.

As discussed herein, compatibility program 30 enables evaluation system 16 to evaluate a compatibility of printing and/or finishing options 54 with document 50 (FIG. 1). To this extent, compatibility program 30 is shown including a conversion module 32, a comparison module 34, an availability module 36, and an adjustment module 38. Operation of each of these modules is discussed further herein. However, it is understood that some of the various modules shown in FIG. 2 can be implemented independently, combined, and/or stored in memory of one or more separate computing devices that are included in evaluation system 16. Further, it is understood that some of the modules and/or functionality may not be implemented, or additional modules and/or functionality may be included as part of evaluation system 16.

Regardless, aspects of the invention provide a solution for managing a document 50 (FIG. 1) in which a selected printing and/or finishing option 54 is evaluated for compatibility with document 50. To this extent, referring to FIGS. 1 and 2, web server 14 can obtain a copy of document 50 via interface module 40. In an embodiment of the invention, system software 8 generates a print file 52 based on document 50 and provides print file 52 for processing by web server 14. In this case, print file 52 comprises a PDL file that includes a series of commands for a printer 44 to print a copy of document 50. System software 8 can generate and store print file 52 using any solution. Additionally, web server 14 obtains printing and finishing options 54 as discussed herein. Web server 14 can provide print file 52 and printing and finishing options 54 for processing by evaluation system 16, which evaluates a compatibility of the various printing and finishing options 54 with print file 52, printer(s) 44, and/or finishing system(s) 46. Evaluation system 16 can provide web server 14 with a set of evaluation results 62 and/or a set of actions 64 based on the evaluation.

FIG. 3 shows an illustrative data flow diagram for the modules of compatibility program 30 (FIG. 2) according to an embodiment of the invention. Conversion module 32 can obtain print file 52 and generate a set of page bitmaps 70 based on print file 52 and/or printing and finishing options 54. In particular, print file 52 can define one or more pages of a medium (e.g., paper) on which a copy of document 50 (FIG. 1) is to be printed. Conversion module 32 can generate a page bitmap 70 for each of the set of pages defined in print file 52. Page bitmap(s) 70 can represent a bitmap of the page, which comprises a matrix of picture elements (pixels), using any bitmapped image representation solution. For example, each page bitmap 70 can represent the page using a bitmap file format, a joint photographic experts group (JPEG) format, a graphics interchange format (GIF), a tagged image file format (TIFF), and/or the like. Page bitmap 70 can comprise a number of vertical and horizontal pixels that conversion module 32 can determine based on a size of the page and a corresponding printing resolution selected in printing and finishing options 54. Additionally, page bitmap 70 can comprise a black and white, color, grayscale, and/or the like, representation of print file 52 based on a selected color/black and white printing option 54.

Regardless, each page bitmap 70 can define printed data for the corresponding page in document 50 (FIG. 1). Printed data refers to that data of page bitmap 70 that directly conveys information to an individual and includes any combination of zero or more: alphanumeric characters, symbols, graphics/images, glyphs, markings, codes, and/or the like. To this extent, printed data typically is applied to an otherwise blank medium by printer 44 (FIG. 1). However, it is understood that a page bitmap 70 could comprise a blank page on which printer 44 does not apply any printed data. Further, it is understood that printer 44 could apply an inverse of printed data.

In any event, comparison module 34 can obtain a page bitmap 70 for a page of document 50 (FIG. 1) and evaluate a compatibility of the page with a selected finishing 54A based on page bitmap 70. For example, comparison module 34 can obtain finishing data 56 based on the selected finishing 54A and use the finishing data 56 and page bitmap 70 to identify an incompatibility, if any. Finishing data 56 can comprise any information regarding the process of generating finished document 60 (FIG. 1) using the selected finishing 54A and how it will impact each page of the finished document. To this extent, finishing data 56 can comprise any type of finishing model that describes and/or represents the resulting impact on a page of document 50. For example, the finishing model can comprise a description of an area of the page that will be impinged (e.g., half inch along left side of paper), a representation (e.g., a bitmap) of the impinged area, a color/color range that may be adversely impacted, and/or the like.

Evaluation system 16 (FIG. 2) can store finishing data 56 in a database or the like and comparison module 34 can obtain finishing data 56 based on selected finishing 54A. Further, comparison module 34 can obtain finishing data 56 based on a size of the medium on which finished document (FIG. 1) is to be printed, location of the finishing, and/or the like. Still further, comparison module 34 can obtain finishing data 56 based on one or more aspects of document 50 (FIG. 1), such as a number of pages, a page size, single/double sided printing, and/or the like.

Figure 4A:
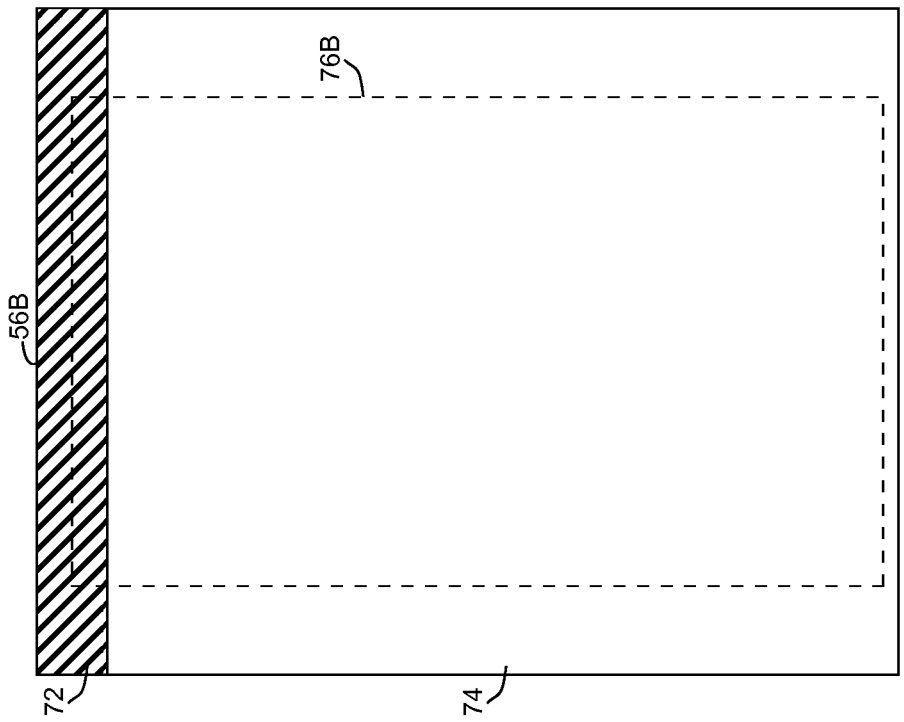
FIGS. 4A-B show illustrative finishing bitmaps according to an embodiment of the invention.
Figure 4B:
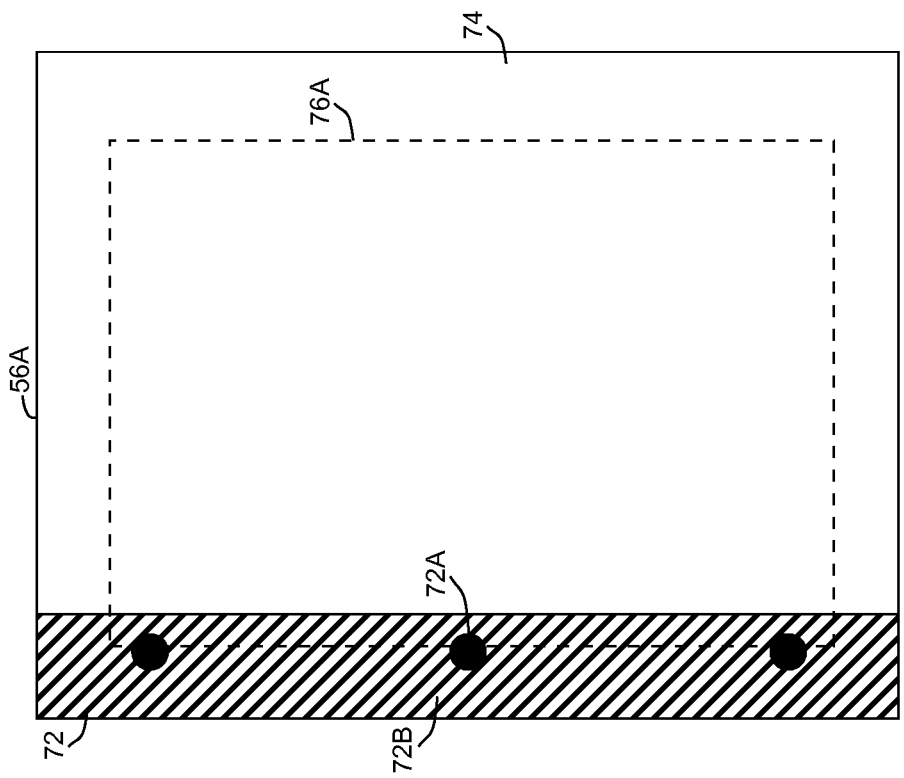

For example, comparison module 34 can determine whether any printed data in page bitmap 70 will be impinged by selected finishing 54A (e.g., a binding, a seal, or the like). In this case, comparison module 34 can obtain a finishing model based on the selected finishing 54A that includes a finishing bitmap. The finishing bitmap can comprise a bitmap representation of the area(s) of a page that will be impinged due to processing selected finishing 54A. FIGS. 4A-B show illustrative finishing bitmaps 56A-B according to an embodiment of the invention. Each finishing bitmap 56A-B includes a set of impinged pixels 72 and a set of visible pixels 74. In an embodiment of the invention, an impinged pixel 72 comprises a pixel of finishing bitmap 56A-B that will be obstructed/difficult to view and/or removed after the corresponding finishing process has been completed. To this extent, finishing bitmap 56A is shown including a set of removed pixels 72A and a set of obstructed pixels 72B, which together form the set of impinged pixels 72. Alternatively, as shown for finishing bitmap 56B, the set of impinged pixels 72 may not differentiate between obstructed or removed pixels, may comprise only removed pixels 72A, may include only obstructed pixels 72B, and/or the like.

Evaluation system 16 (FIG. 2) can store finishing bitmaps 56A-B that correspond to a typical combination of page size, resolution and finishing. To this extent, finishing bitmap 56A can correspond to a side 3-ring binding for an 8.5"×11" page printed using an arbitrary resolution. Similarly, finishing bitmap 56B can correspond to a top spiral binding for an 8.5"×11" page printed using an arbitrary resolution. Consequently, when page bitmap 70 (FIG. 3) and selected finishing 54A (FIG. 3) correspond to the combined page size, resolution and finishing of a stored finishing bitmap 56A-B, then comparison module 34 (FIG. 3) can obtain the stored finishing bitmap 56A-B.

Additionally, comparison module 34 (FIG. 3) can dynamically generate finishing bitmap 56A-B based on a finishing model for the selected finishing 54A, document 50 (FIG. 1) and/or printing and finishing options 54. In particular, user 2 (FIG. 1) could request that a copy of document 50 be printed on a non-standard size medium, bound using a non-standard number/configuration of rings, and/or the like. Similarly, finishing bitmap 56A-B may vary based on a number of pages in document 50, a location of a page in document 50, and/or a side of the page on which data is printed. For example, when bound using glue or the like, a width of the set of impinged pixels 72 may vary based on a location of the page (e.g., beginning, middle, end), a side of the page (front or back), and/or the like. In either case, comparison module 34 can obtain the finishing model, which is stored in evaluation system 16 (FIG. 2), that corresponds to a type and/or size of the selected finishing 54A (e.g., ring binding, spiral binding, etc.) to dynamically generate a finishing bitmap 56A-B based on its known attributes. For example, the finishing model can define the physical location and dimensions of an impinged area (e.g., topmost half inch), and comparison module 34 can generate finishing bitmap 56B based on the defined impinged area.

Figure 5A:
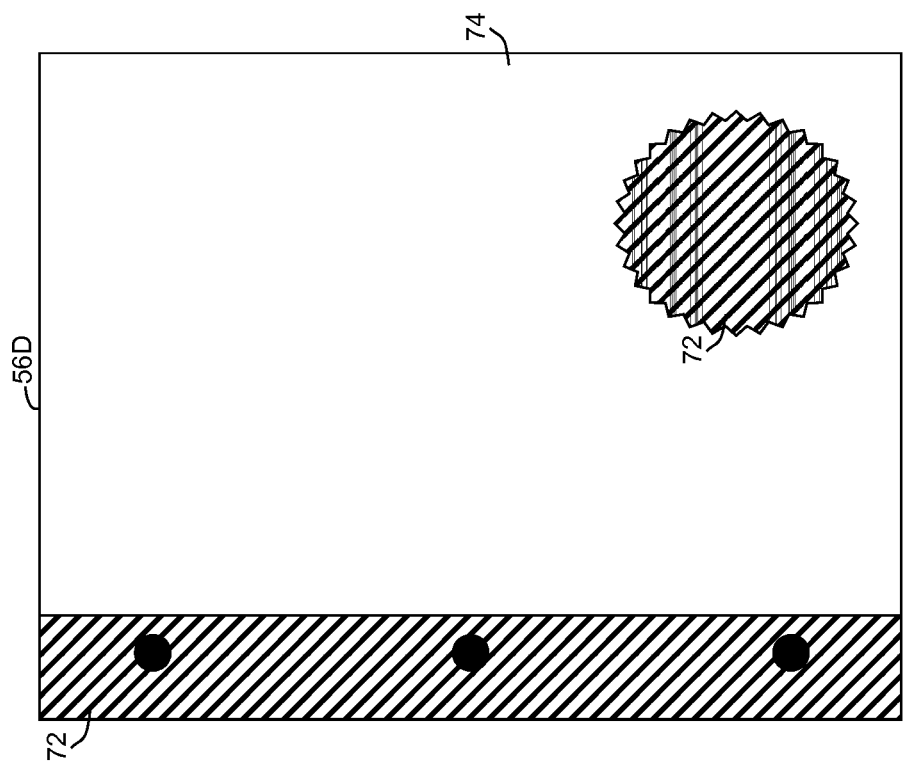
FIGS. 5A-B show illustrative finishing bitmaps according to another embodiment of the invention.
Figure 5B:
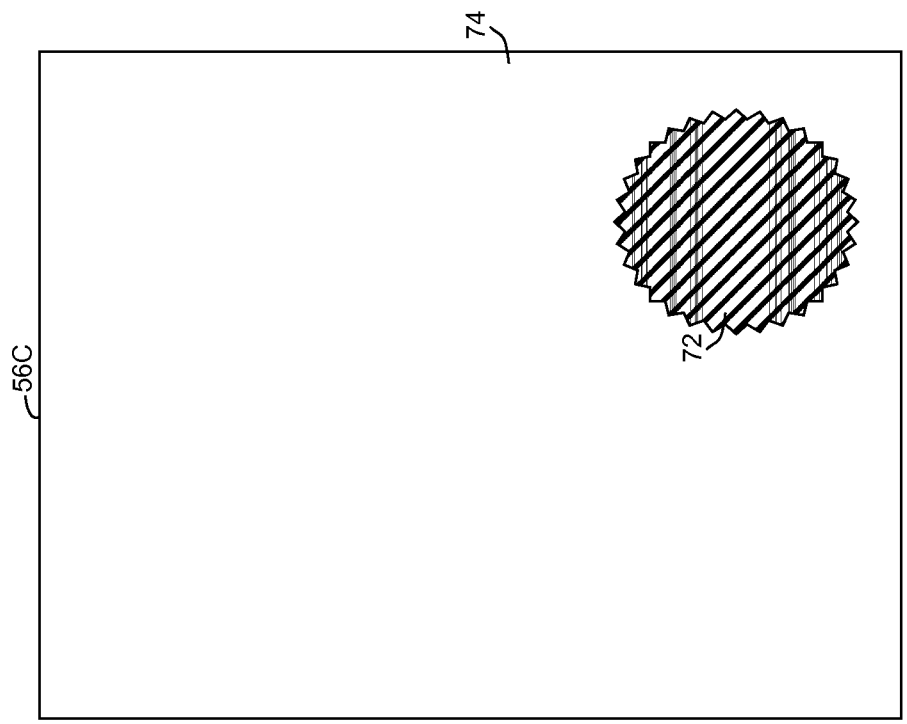

Frequently, as discussed herein, the selected finishing(s) 54A correspond to a solution for binding (attaching) two or more pages. However, selected finishing 54A also can correspond to the application of one or more items to the medium after printing. For example, FIG. 5A shows an illustrative finishing bitmap 56C that includes a set of impinged pixels 72 that correspond to an area on which a finishing system 46 (FIG. 1) will apply a seal, a watermark, and/or the like. To this extent, it is understood that a selected finishing 54A may correspond to only a single page of a multi-page document 50 (FIG. 1) and/or multiple selected finishings 54A may be applicable for some or all of the pages of document 50. In the latter case, comparison module 34 (FIG. 3) can dynamically generate a finishing bitmap based on the multiple selected finishings 54A that apply for a particular page. For example, FIG. 5B shows an illustrative dynamic finishing bitmap 56D that comparison module 34 can generate by combining finishing bitmap 56A (FIG. 4A) with finishing bitmap 56C (FIG. 5A).

In any event, referring to FIGS. 3 and 4A, after obtaining a finishing bitmap, such as finishing bitmap 56A, comparison module 34 can determine if any of the printed data defined in page bitmap 70 intersects at least one impinged pixel 72 in finishing bitmap 56A. In an embodiment of the invention, comparison module 34 performs a logical intersection on finishing bitmap 56A and page bitmap 70 and determines whether the result is non-zero. If so, then comparison module 34 can generate an evaluation result 62 that indicates that at least some printed data in page bitmap 70 will be impinged by the selected finishing 54A. Otherwise, evaluation result 62 can indicate that the page is compatible with selected finishing 54A. Alternatively, comparison module 34 can determine whether any printed data will be impinged without obtaining and/or generating finishing bitmap 56B. For example, when the finishing model includes a physical description of the impinged area, comparison module 34 can analyze the corresponding area of page bitmap 70 to determine whether any printed data is present and would be impinged.

Further, comparison module 34 can evaluate other types of finishings that may not impinge all types of printed data. For example, selected finishing 54A can comprise one or more colored transparent covers, dividers, sleeves, and/or the like. In this case, printed data of a similar color on an adjacent page bitmap 70 may be obscured. To this extent, a finishing model for selected finishing 54A can define a color range that will not be readily visible through the colored transparency. Comparison module 34 can compare the printed data with the color range to determine whether the printed data includes any data that would be impinged by the colored transparency. Similarly, comparison module 34 can compare the printed data with a color of the medium on which page bitmap 70 is to be printed.

Still further, a selected finishing 54A may impinge printed data that requires a threshold amount of toner. For example, selected finishing 54A may comprise the application of a varnish on the medium. In this case, a finishing model for the selected finishing 54A could define a threshold quantity of toner that may result in smearing/rubbing during the varnishing. Similarly, selected finishing 54A may require folding the medium. In this case, an excessive amount of toner along the fold may result in the toner cracking. In either case, comparison module 34 can obtain printer data 58 that identifies a quantity of toner that is required for printing various colors. Comparison module 34 can use printer data 58 and page bitmap 70 to determine whether any of the printed data exceeds the threshold quantity of toner.

Comparison module 34 can repeat the evaluation process for each of a plurality of page bitmaps 70, e.g., one for each page of document 50 (FIG. 1). To this extent, comparison module 34 can generate an evaluation result 62 that includes an indication of the page(s) of document 50, if any, that include printed data that would be impinged by the selected finishing(s) 54A. Additionally, when available in finishing bitmap 56A (e.g., for a binding or seal), evaluation result 62 can further identify whether the impinged printed data would be obscured and/or removed by selected finishing 54A.

Comparison module 34 also can include a graphical representation of one or more pages of document 50 (FIG. 1) in evaluation results 62. For example, comparison module 34 can generate a finished page bitmap for inclusion in evaluation results 62 based on page bitmap 70 and selected finishing 54A. To this extent, the finished page bitmap can include the content of page bitmap 70 with shading or the like added based on finishing bitmap 56A. In this manner, the finished page bitmap can provide a visual rendering of the document page that indicates the portion(s) of the printed page that will be impinged. In an embodiment of the invention, comparison module 34 includes a finished page bitmap in evaluation results 62 for each page of document 50. Alternatively, comparison module 34 can include a finished page bitmap only for selected page(s) of document 50 (e.g., those page(s) that include impinged printed data).

Referring to FIGS. 1 and 3, evaluation system 16 can perform additional evaluations with respect to document 50 and the selected printing and finishing options 54. To this extent, availability module 36 can evaluate a compatibility of one or more of the printing and finishing options 54 with a page of document 50 and/or a printer 44. For example, availability module 36 can obtain printer data 58 that includes information on the capabilities and/or availability of each printer 44. Print server 18 (FIG. 1) can manage printer data 58 using any solution. In any event, printer data 44 may define a set of printers 44 that support only a limited number of finishing systems 46. In this case, when a printing option, such as color printing or high resolution, requires printing by one of the set of printers 44, availability module 36 can use printer data 58 to determine whether a selected finishing 54A is supported. Similarly, a selected finishing 54A may be only compatible with a certain type of medium. Further, availability module 36 can evaluate a compatibility of a selected page size with another printing option.

Additionally, availability module 36 can evaluate a compatibility of the color(s) included page bitmap 70 with respect to the corresponding printer 44 and/or print options. For example, availability module 36 can evaluate a color of a selected medium with the color(s) in page bitmap 70 and include an indication in evaluation results 62 when the color(s) are too similar. Additionally, availability module 36 can evaluate whether any page bitmap 70 for document 50 includes non-grayscale color that would require the use of a selected color printer 44. In this case, availability module 36 can include an indication in evaluation result 62 that the selected color printer 44 may not be required.

While operation of comparison module 34 has been described with reference to evaluating a page of document 50 using a page bitmap 70, it is understood that comparison module 34 can obtain and use any type of model of the page to evaluate its compatibility with selected finishing 54A. To this extent, in various embodiments of the invention, comparison module 34 can obtain a page model that includes a description of a set of page attributes (e.g., margin(s), color(s), and/or the like), a representation of the page (e.g., page bitmap 70, PDL command(s), a vector graphic representation, and/or the like), and/or the like. Comparison module 34 can obtain the page model using any solution. For example, comparison module 34 can obtain the page model from a set of inputs provided by user 2 to interface module 40, e.g., when the page model comprises a description of a set of page attributes. Alternatively, conversion module 32 can process document 50 and/or print file 52 to generate the page model for use by comparison module 34. In either case, the page model may not include any editable content for the page of document 50, but rather be derived from/based on document 50 and include only that information required to evaluate the page with respect to the selected finishing 54A. In any event, comparison module 34 can evaluate any type of page model with any type of model for selected finishing 54A to generate evaluation result(s) 62.

Interface module 40 can obtain evaluation result(s) 62 and perform zero or more actions based on evaluation result(s) 62. For example, interface module 40 can generate an interface for presentation to user 2 that includes a visual representation of one or more of the pages of document 50 as finished (e.g., the finished page bitmap). Additionally, when evaluation result 62 indicates that printed data on one or more pages of document 50 may be impinged by a selected finishing 54A, interface module 40 can generate a warning for presentation (e.g., display) to user 2. The warning can indicate the page(s) of document 50 that include impinged printed data and/or whether the printed data would be obscured and/or removed by the selected finishing 54A. Further, the warning can include a depiction of the finished page(s) that include impinged print data (e.g., using the finished page bitmap). In response, user 2 can review one or more of the pages and edit document 50 (e.g., change margin(s), paper size, and/or the like), select a new finishing, ignore the warning and proceed with the order (e.g., only unimportant or identification/control information is obscured), and/or the like. Similarly, interface module 40 can generate a warning for presentation to user 2 based on any other incompatibilities detected by evaluation system 16.

Additionally, adjustment module 38 can obtain a set of actions 64 for addressing an incompatibility included in the set of evaluation results 62. For example, when a page bitmap 70 includes impinged print data, adjustment module 38 can identify a set of actions 64 that will correct the impinged print data. In particular, referring briefly to FIGS. 4A-B, adjustment module 38 can determine a bounding rectangle 76A-B for the print data for page bitmap 70. Adjustment module 38 can determine whether the print data can be shifted left/right and/or up/down to remove the impinged print data. To this extent, adjustment module 38 could determine that bounding rectangle 76A can be moved right to remove impinged print data, however, bounding rectangle 76B cannot be moved down to entirely remove impinged print data.

Returning to FIGS. 1 and 3, adjustment module 38 can identify numerous other alternative actions, including for example, scaling the print data, adjusting a paper size, and/or the like. To this extent, adjustment module 38 can determine a document bounding rectangle that includes all the print data for all the pages of document 50, rather than just the particular page(s) that include impinged print data, and identify action(s) 64 based on the document bounding rectangle.

Further, adjustment module 38 can identify a set of alternative finishing selections that will not impinge on the print data and include the alternative finishing selection(s), if any, in the action(s) 64. Adjustment module 38 can limit the set of actions 64 to those actions that are available with the currently selected printer 44 and/or finishing system 46. To this extent, in an embodiment of the invention, adjustment module 38 can obtain a set of available finishing options for the currently selected printer 44 from availability module 36. Adjustment module 38 can provide one or more of the available finishing options for evaluation by comparison module 34 to determine whether any printed data in document 50 would be impinged. When no printed data is impinged, the finishing option can be added to the set of alternative finishing selections. Adjustment module 38 can evaluate any subset of or all of the finishing options available. For example, each finishing option can be classified based on the quality, location and/or amount of impinged area, and/or the like. In this case, adjustment module 38 can evaluate those finishing option(s) that are similar to selected finishing 54A first, and subsequently evaluate other finishing options if no alternative finishing selection has been located.

Regardless, interface module 40 can obtain the set of actions 64 and generate a user interface for presenting the set of actions 64 to user 2. The user interface can include one or more alternative finishing selections, an indication that no alternative finishing selection is available, one or more adjustments to the printed data in document 50, and/or the like. In response, user 2 can select an action 64, perform an alternative action, ignore the incompatibility(ies), and/or the like. When user 2 selects one or more of the set of actions 64, adjustment module 38 can perform the action(s) to address the incompatibility(ies).

In any event, once user 2 has completed the order, processing module 42 can obtain print file 52 and printing and finishing options 54 and manage the generation of finished document 60. To this extent, print server 18 can use print file 52 and the printing options to print a designated number of copies of document 50 using one or more printers 44. Additionally, one or more finishing systems 46 can finish the copy(ies) of document 50 according to the selected finishing(s) 54A (e.g., add cover(s), bind, varnish, and/or the like). Subsequently, finished document(s) 60 can be provided to user 2 and/or delivered according to instructions in the order.

While shown and described herein as a method and system for managing a document, it is understood that the invention further provides various alternative embodiments. For example, in one embodiment, the invention provides a computer program stored on a computer-readable medium, which when executed, enables a computer system to evaluate a compatibility of printing and/or finishing options with a document. To this extent, the computer-readable medium includes program code, such as compatibility program 30 (FIG. 2), which implements the evaluation process described herein. It is understood that the term "computer-readable medium" comprises one or more of any type of tangible medium of expression capable of embodying a copy of a work (e.g., a physical embodiment), such as the program code. In particular, the computer-readable medium can comprise one or more portable storage articles of manufacture, one or more data storage portions of a computing device, such as memory 22A (FIG. 2) and/or storage system 22B (FIG. 2), as a data signal traveling over a network (e.g., during a wired/wireless electronic distribution of the computer program), on paper (e.g., capable of being scanned and converted to electronic data), and/or the like.

In another embodiment, the invention provides a method of generating a system for managing a document. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. For example, evaluation system 16 can be deployed to computer system 12. To this extent, the deployment can comprise one or more of: (1) installing program code on a computing device, such as computing device 16A (FIG. 2), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that performs the process described herein on a subscription, advertising, and/or fee basis. That is, a service provider, such as a printing service, could offer to manage a document, including the generation of finished document 60, as described herein. In this case, the service provider can manage (e.g., create, maintain, support, etc.) a computer system, such as computer system 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computerized method of managing a print request including a selected finishing for an electronic document, the method comprising:

obtaining, on a computer system including at least one computing device, electronic data for a page model for a page of the document and electronic data for a finishing model for the selected finishing for the document, wherein the page model corresponds to a set of attributes of content defined in the document for presentation on the page and wherein the finishing model corresponds to a set of attributes of at least one area of a page impinged by the selected finishing; and the computer system automatically evaluating a compatibility of the page with the selected finishing in response to the obtaining, wherein the evaluating includes comparing the electronic data for the page model and the electronic data for the finishing model by the computer system to determine whether the page is compatible or incompatible with the selected finishing, wherein the page is indicated as being incompatible when any of the content for presentation on the page will be either removed or obstructed as a result of the selected finishing.

2. The method of claim 1, wherein the electronic data for the page model comprises a page bitmap including a set of pixels representing printed data for the page, and wherein the comparing determines whether any of the set of pixels representing printed data on the page bitmap will be impinged by the selected finishing.

3. The method of claim 2, wherein the electronic data for the finishing model comprises a finishing bitmap including a set of impinged pixels and a set of visible pixels for the page of the document, and wherein the comparing determines whether any of the set of pixels representing printed data intersects at least one impinged pixel on the finishing bitmap.

4. The method of claim 3, wherein the set of impinged pixels includes a set of removed pixels and a set of obscured pixels.

5. The method of claim 1, further comprising automatically repeating the obtaining and evaluating for each page of the document.

6. The method of claim 1, wherein the obtaining includes:
the computer system obtaining a page description language (PDL) file for the document; and
the computer system generating the electronic data for the page model based on the PDL file.

7. The method of claim 1, further comprising the computer system generating a warning for presentation to a user in response to the evaluating indicating the page is incompatible with the selected finishing.

8. The method of claim 1, further comprising the computer system providing a set of actions for addressing an incompatibility between the page and the selected finishing for the presentation to a user in response to the evaluating indicating the incompatibility.

9. The method of claim 8, wherein the set of actions includes at least one alternative finishing selection.

10. The method of claim 1, further comprising:
printing at least one copy of the document after the evaluating; and
finishing the at least one copy of document according to the selected finishing.

11. The method of claim 1, further comprising:
the computer system generating a finished page bitmap based on the page model and the selected finishing; and
the computer system providing the finishing page bitmap for presentation to a user.

12. The method of claim 1, further comprising:
obtaining at least one printing option for the document on the computer system; and
the computer system evaluating a compatibility of the at least one printing option with at least one of: the page or the selected finishing in response to obtaining the at least one printing option.

13. A computer system comprising:
at least one computing device for managing a print request including a selected finishing for an electronic document by performing a method comprising:
obtaining, on the at least one computing device, electronic data for a page model for a page of the document and electronic data for a finishing model for the selected finishing for the document, wherein the page model corresponds to a set of attributes of content defined in the document for presentation on the page and wherein the finishing model corresponds to a set of attributes of at least one area of a page impinged by the selected finishing; and
the at least one computing device automatically evaluating a compatibility of the page with the selected finishing in response to the obtaining, wherein the evaluating includes comparing the electronic data for the page model and the electronic data for the finishing model to determine whether the page is compatible or incompatible with the selected finishing, wherein the page is indicated as being incompatible when any of the content for presentation on the page will be either removed or obstructed as a result of the selected finishing.

14. The system of claim 13, wherein the electronic data for the page model comprises a page bitmap including a set of pixels representing printed data for the page, and wherein the comparing determines whether any of the set of pixels representing printed data on the page bitmap will be impinged by the selected finishing.

15. The system of claim 14, wherein the electronic data for the finishing model comprises a finishing bitmap including a set of impinged pixels and a set of visible pixels for the page of the document, and wherein the comparing determines whether any of the set of pixels representing printed data intersects at least one impinged pixel on the finishing bitmap.

16. The system of claim 13, wherein the obtaining includes:
the at least one computing device obtaining a page description language (PDL) file for the document; and
the at least one computing device generating the electronic data for the page model based on the PDL file.

17. The system of claim 13, the method further comprising the at least one computing device generating a warning for presentation to a user in response to the evaluating indicating the page is incompatible with the selected finishing.

18. The system of claim 13, the method further comprising the at least one computing device providing a set of actions for addressing an incompatibility between the page and the selected finishing for the presentation to a user in response to the evaluating indicating the incompatibility.

19. The system of claim 13, the method further comprising:
printing at least one copy of the document after the evaluating; and
finishing the at least one copy of document according to the selected finishing.

20. The system of claim 13, the method further comprising:
the at least one computing device generating a finished page bitmap based on the page model and the selected finishing; and
the at least one computing device providing the finishing page bitmap for presentation to a user.

21. A computer program comprising program code stored on a non-transitory computer-readable medium, which when executed, enables a computer system including at least one computing device to implement a method of managing a print request including a selected finishing for an electronic document, the method comprising:
obtaining, on the computer system, electronic data for a page model for a page of the document and electronic data for a finishing model for the selected finishing for the document, wherein the page model corresponds to a set of attributes of content defined in the document for presentation on the page and wherein the finishing model corresponds to a set of attributes of at least one area of a page impinged by the selected finishing; and the computer system automatically evaluating a compatibility of the page with the selected finishing in response to the obtaining, wherein the evaluating includes comparing the electronic data for the page model and the electronic data for the finishing model to determine whether the page is compatible or incompatible with the selected finishing, wherein the page is indicated as being incompatible when any of the content for presentation on the page will be either removed or obstructed as a result of the selected finishing.

22. The computer program of claim 21, wherein the electronic data for the page model comprises a page bitmap including a set of pixels representing printed data for the page, and wherein the comparing determines whether any of the set of pixels representing printed data on the page bitmap will be impinged by the selected finishing.

23. The computer program of claim 22, wherein the electronic data for the finishing model comprises a finishing bitmap including a set of impinged pixels and a set of visible pixels for the page of the document, and wherein the comparing determines determining whether any of the set of pixels representing printed data intersects at least one impinged pixel on the finishing bitmap.

24. The computer program of claim 21, the method further comprising automatically repeating the obtaining and evaluating for each page of the document.

25. The computer program of claim 21, the method further comprising the computer system providing a set of actions for addressing an incompatibility between the page and the selected finishing for presentation to a user.

26. The computer program of claim 21, wherein the obtaining includes:
  obtaining, on the computer system, a page description language (PDL) file for the document; and
  the computer system generating the electronic data for the page model based on the PDL file.

27. The computer program of claim 21, the method further comprising:
  obtaining, on the computer system, at least one printing option for the document; and
  the computer system evaluating a compatibility of the at least one printing option with at least one of: the page or the selected finishing.

28. The computer program of claim 21, the method further comprising:
  the computer system generating a finished page bitmap based on the page model and the selected finishing; and
  the computer system providing the finishing page bitmap for presentation to a user.

29. A method of generating a system for managing a print request including a selected finishing for an electronic document, the method comprising:
  providing a computer system operable to:
    obtain, on at least one computing device of the computer system, electronic data for a page model for a page of the document and electronic data for a finishing model for a selected finishing for the document, wherein the page model corresponds to a set of attributes of content defined in the document for presentation on the page and wherein the finishing model corresponds to a set of attributes of at least one area of a page impinged by the selected finishing; and
    automatically evaluate, by at least one computing device of the computer system, a compatibility of the page with the selected finishing in response to the obtaining, wherein the evaluating includes comparing the electronic data for the page model and the electronic data for the finishing model to determine whether the page is compatible or incompatible with the selected finishing, wherein the page is indicated as being incompatible when any of the content for presentation on the page will be either removed or obstructed as a result of the selected finishing.

30. A computer system comprising:
  a set of computing devices for managing the generation of a finished document by performing a method comprising:
    obtaining, on at least one of the set of computing devices, electronic data for a finishing model based on a selected finishing for a document and electronic data for a page bitmap for a page of the document, wherein the page bitmap includes a set of pixels representing printed data for the page and wherein the finishing model corresponds to a set of attributes of at least one area of a page impinged by the selected finishing; and
    automatically determining, by at least one of the set of computing devices, whether the page is compatible or incompatible with the selected finishing, wherein the page is indicated as being incompatible when any of the set of pixels representing printed data in the page bitmap will be impinged by the selected finishing, wherein the determining includes comparing the electronic data for the finishing model and the corresponding electronic data for the page bitmap to determine whether any of the set of pixels representing printed data on the page will be either removed or obstructed as a result of the selected finishing.

31. The system of claim 30, the method further comprising automatically repeating the obtaining and evaluating for each of a plurality of pages of the document.

32. The system of claim 31, wherein the selected finishing comprises a binding for the plurality of pages of the document.

33. The system of claim 32, wherein the finishing model varies based on a location of the page in the document.

34. The system of claim 30, the method further comprising:
  printing at least one copy of the document after the determining; and
  finishing the at least one copy of the document according to the selected finishing.

* * * * *